R. P. HALL.
AEROPLANE.
APPLICATION FILED DEC. 19, 1910.
1,005,026.
Patented Oct. 3, 1911.
4 SHEETS—SHEET 3.
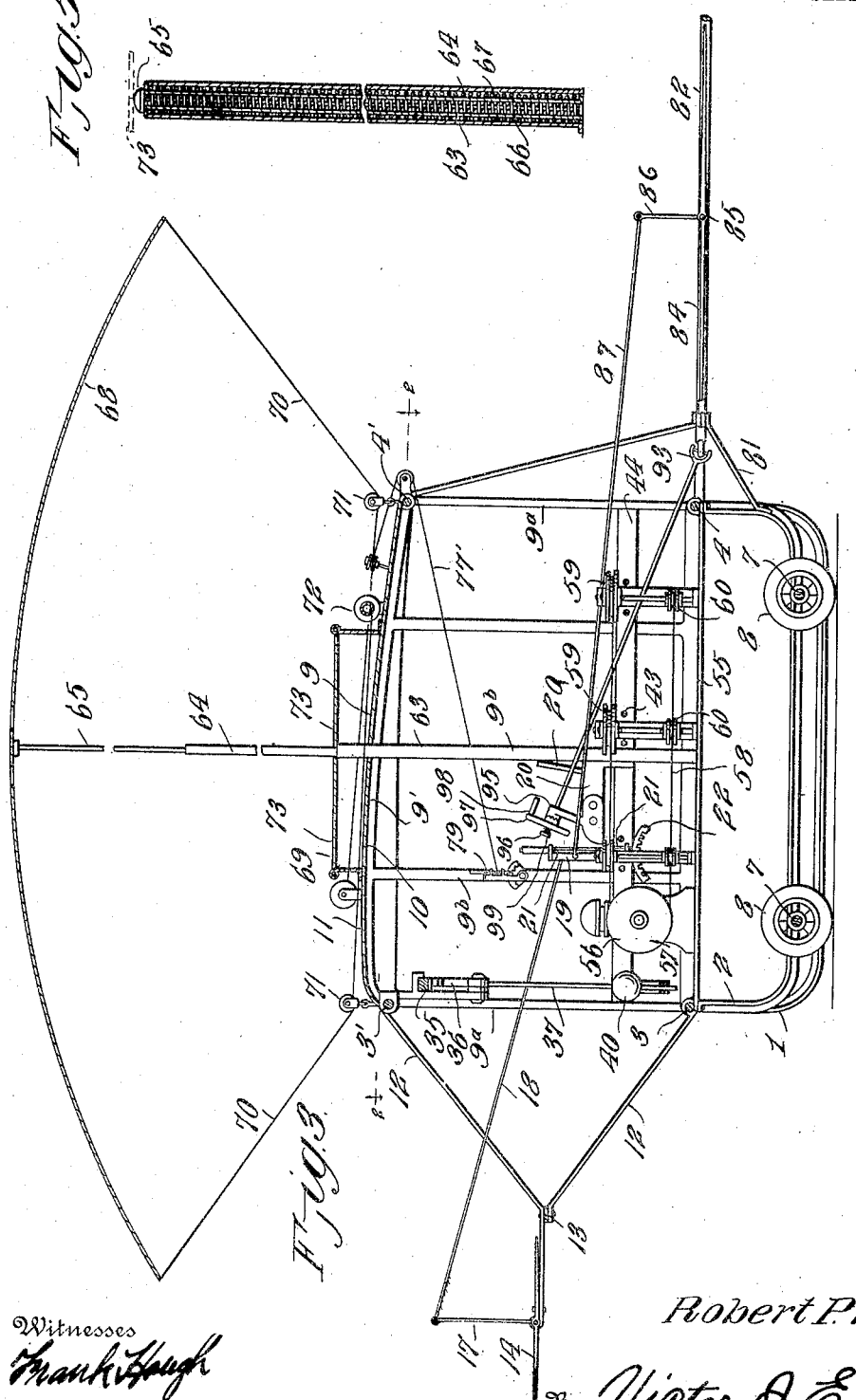
Witnesses
Frank Hough
C. C. Hines
Inventor
Robert P. Hall,
By Victor J. Evans
Attorney R. P. HALL.
AEROPLANE.
APPLICATION FILED DEC. 19, 1910.
1,005,026.
Patented Oct. 3, 1911.
4 SHEETS—SHEET 4.
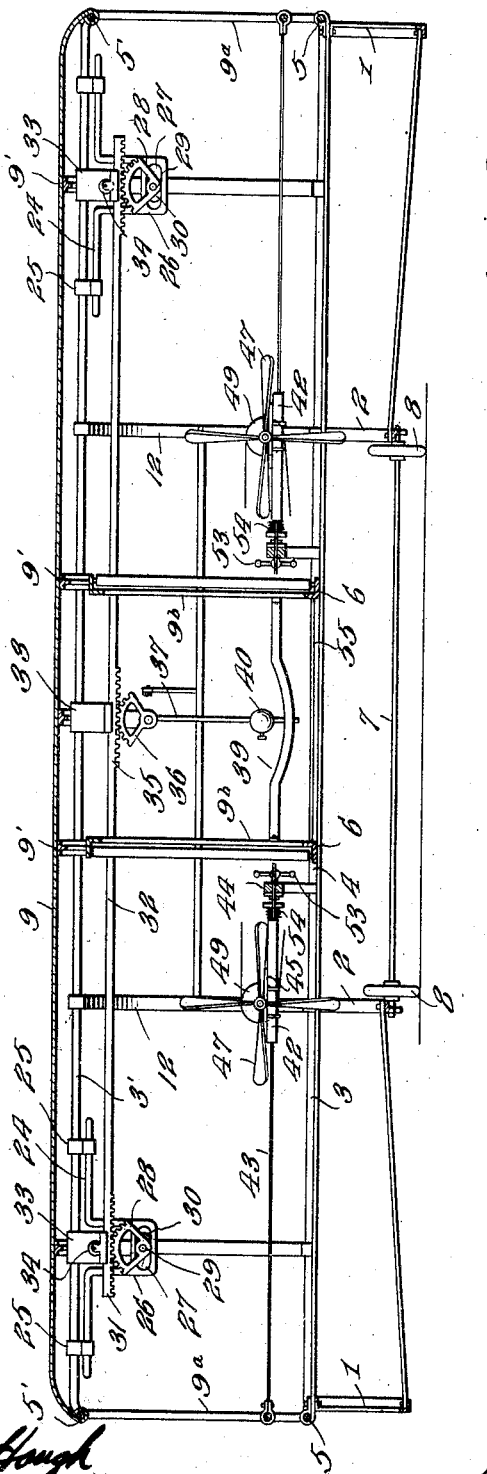
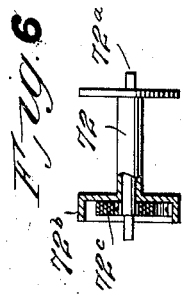
Inventor
Robert P. Hall,
By Victor J. Evans
Attorney
Witnesses
Frank Hough
C. C. Hines

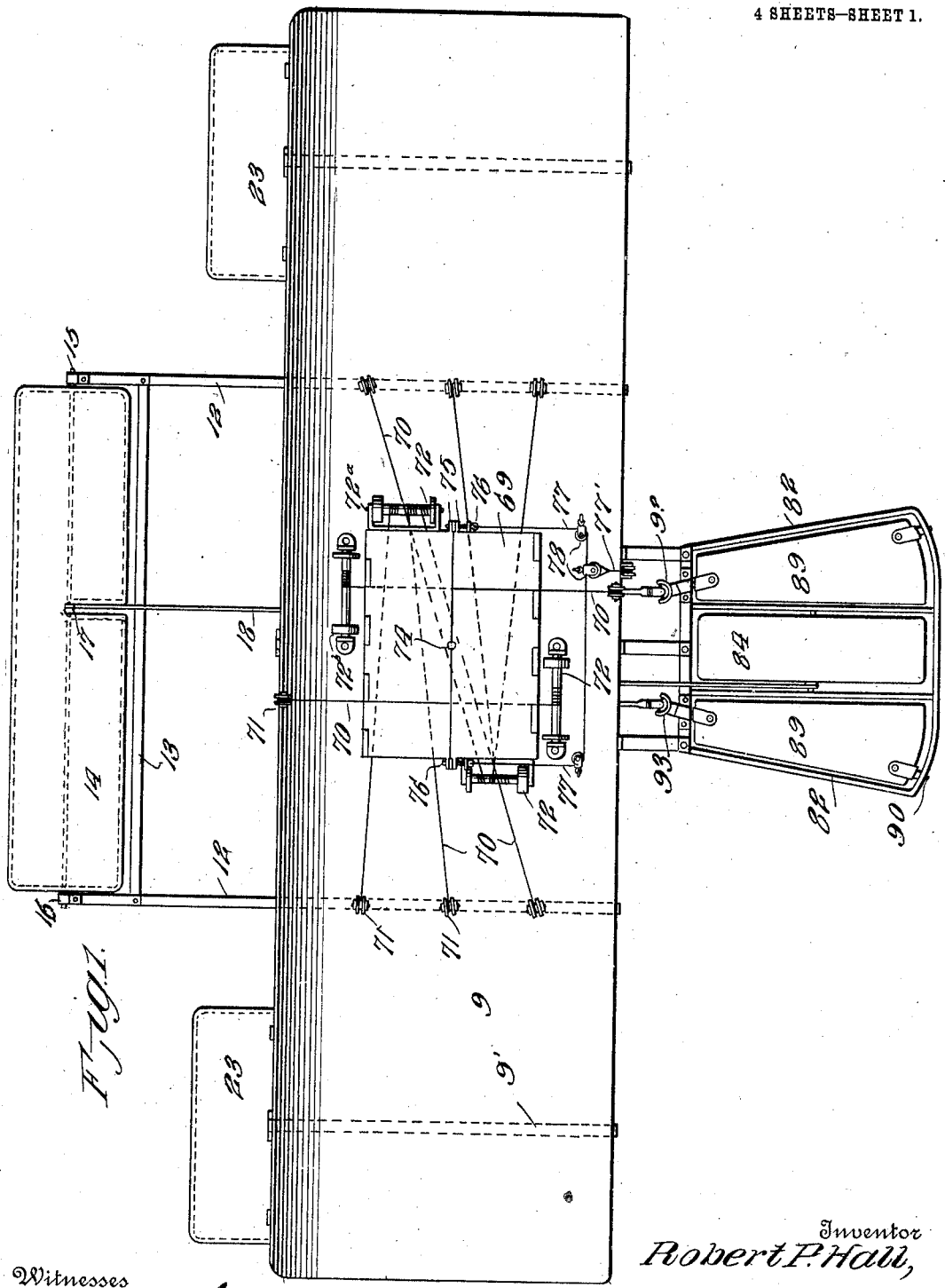

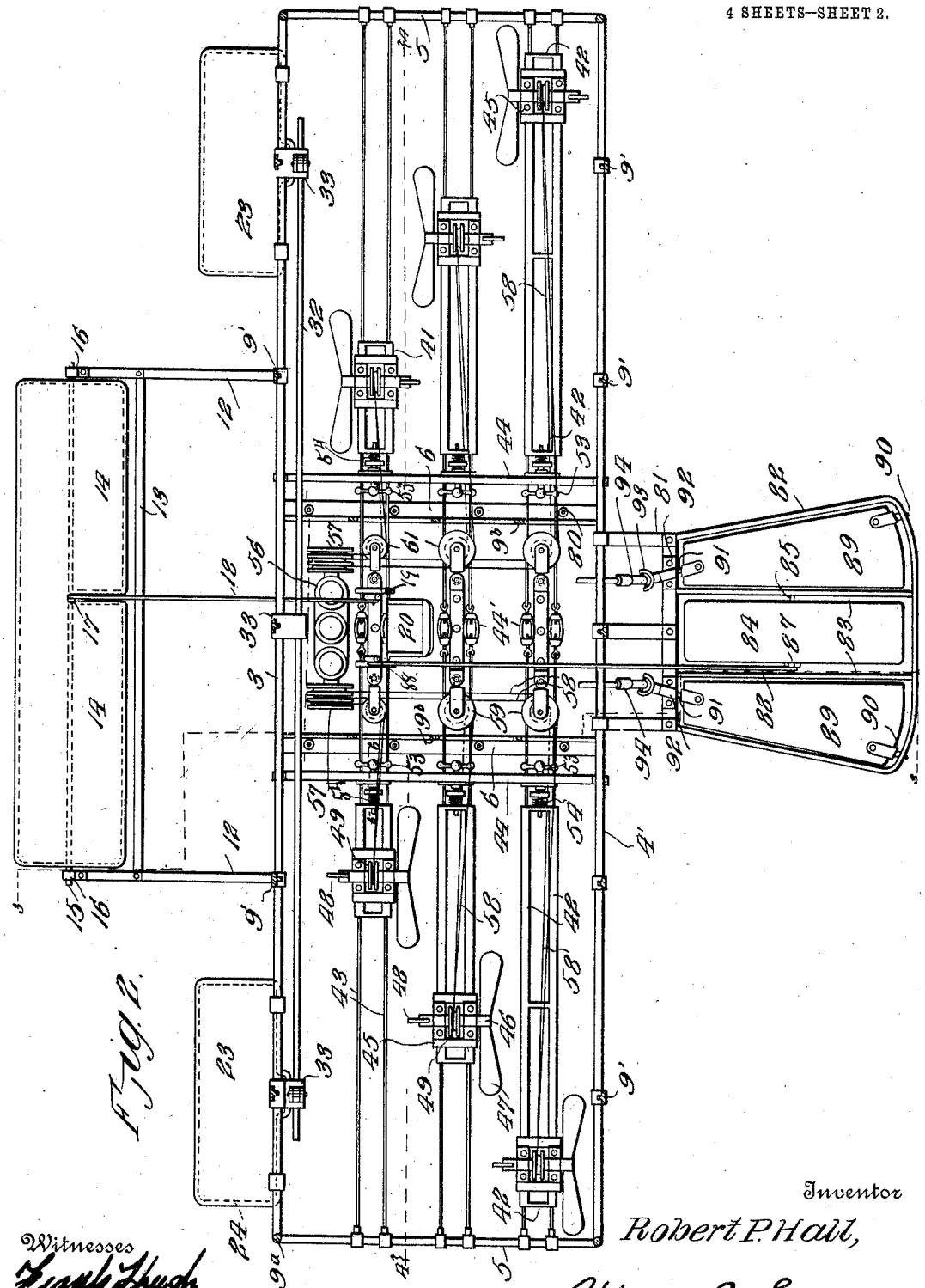

UNITED STATES PATENT OFFICE.

ROBERT P. HALL, OF SEARCHLIGHT, NEVADA.

AEROPLANE.

1,005,026. Specification of Letters Patent. Patented Oct. 3, 1911.

Application filed December 19, 1910. Serial No. 597,975.

*To all whom it may concern:*

Be it known that I, ROBERT P. HALL, a citizen of the United States, residing at Searchlight, in the county of Clark and State of Nevada, have invented new and useful Improvements in Aeroplanes, of which the following is a specification.

This invention relates to flying machines of the heavier-than-air type, the objects of the invention being to provide a machine having sufficient lifting capacity to support the weight of its load and a limited amount of freight or number of passengers; to provide simple and effective means for steering the machine vertically and horizontally; to provide means for automatically balancing and maintaining the lateral stability of the machine; and to provide a parachute attachment for insuring a safe landing in the event of damage to the propelling means and supporting surface of the machine.

The invention consists of the features of construction, combination and arrangement or parts, hereinafter fully described and claimed, reference being had to the accompanying drawings, in which:—

Figure 1 is a top plan view, omitting certain parts, of a flying machine embodying my invention. Fig. 2 is a horizontal section on the line 2—2 of Fig. 3. Fig. 3 is a vertical longitudinal section on the irregular line 3—3 of Fig. 2. Fig. 4 is a vertical transverse section on the line 4—4 of Fig. 2. Fig. 5 is a section through the collapsed telescopic parachute staff. Fig. 6 is a sectional elevation of one of the winding drums controlling the parachute cords.

The main frame of the machine may be of any suitable construction, but as shown includes in its illustrated organization outer and inner bow-shaped members 1 and 2 connected at the top with front and rear rails 3 and 4, end rails 5, and suitable cross pieces 6. The inner or intermediate bow-shaped members 2 form bearings for the ends of shafts 7 carrying wheels or rollers 8 to run upon the ground in launching and landing. These wheels are preferably equipped, as usual, with pneumatic tires which normally project below the plane of the base surfaces of the outer bow-shaped members 1. When, however, the wheels 8 strike the earth with sufficient force to flatten the tires to an appreciable extent, the base surfaces of the members 1 come in contact with the surface of the ground and act as skids or runners to assist in absorbing the shocks and jars and to support the machine in a stable manner.

The portions 3, 4, 5 and 6 support the main flotation plane or supporting surface 9 of the machine, which may be composed of fabric stretched over suitable ribs 9' forming part of an upper main frame section composed of front and rear bars 3' and 4' and cross pieces 5' connected with the main frame by uprights 9ª and 9ᵇ. The plane or surface 9 may be of any proper curvature from front to rear for the aerodynamical reaction of the air thereon, but in any event preferably has its forward portion concavo-convexly curved to present a concaved compression side or surface 10 and a convex rarefaction surface 11. The arc of curvature of this portion and formation of the compression and rarefaction surface is such as to promote the compression of the air beneath the plane and the vacuum forming action above the plane, thus increasing the lifting capacity of the supporting surface to a considerable extent. While but a single supporting surface is disclosed in the present instance, a similar surface may be secured to and between the bowed frame members above the plane of the supporting wheels, to convert the machine from a monoplane to a biplane machine.

Parallel bars 12 project from the front of the main frame and are connected by one or more cross pieces 13 to form a support for a horizontal rudder 14, the shaft 15 of which rudder is journaled to turn in suitable bearings 16, on which the rudder has movement in a vertical plane. A crank arm 17 is connected with the rudder shaft and coupled by a link rod 18 with a pivoted operating lever 19, arranged at one side of the pilot's seat 20, whereby upon shifting the lever in one direction or the other the rudder may be adjusted to guide the machine upward and downward. The lever is provided with a spring-actuated dog or pawl 21 to engage a rack 22 on the frame by which the rudder may be fixed in any of its positions of adjustment.

Stabilizing wings 23 are arranged at the front marginal edges of the supporting surface adjacent to the lateral margin thereof. Each of these wings includes a frame portion 24 hinged to the main frame, as at 25, to swing in a vertical plane and provided with a depending right angular portion 26 provided with a transverse slot 27. Journaled on the main frame are two segments 28, the shafts 29 of which carry cams or eccentrics 30 which operate in the slotted portions 27 to swing the stabilizing wings in an upward and downward direction. The cam member 30 of one segment is arranged on one side of the shaft thereof, while the cam member of the other segment is arranged on the reverse side of its shaft, so that a swinging movement of both segments in the same general direction will result in an upward swinging movement being imparted to one wing while a corresponding downward swinging movement is imparted to the other wing. The segments engage the rack toothed ends 31 of a bar 32 mounted to slide transversely of the machine in suitable guides 33, some of which may be provided with friction rollers 34.

Suitable mechanism is provided for automatically shifting the bar in one direction to the other when the lateral balance of the machine is disturbed to adjust the stabilizing wings to effect a restoration of the machine to a normal horizontal position. As shown in the present instance, the central portion of the bar is rack toothed, as at 35, to engage a toothed segment 36 upon the upper end of a lever 37 pivoted at 38 to swing in a direction laterally of the machine, said lever having its lower end arranged to move in a suitable arcuate guide member 39 and carrying a weight 40. The lever thus acts in the nature of a pendulum or gravity-controlled member which maintains a vertical position when the machine tilts laterally in either direction and thus sets up a relative motion to shift the bar 32 laterally in one direction or the other to adjust the stabilizing wings. It will be understood that through the action of the automatic controlling mechanism the wing at the elevated side of the machine will be swung upward to effect a depression of such side of the machine while the wing at the opposite side of the machine will be swung downward to effect the elevation of such side of the machine, by which the machine will be automatically restored to normal position and the lateral balance at all times in the operation of the machine preserved.

The propelling mechanism comprises sets or series of propellers 41 arranged on opposite sides of the longitudinal center of the machine, the propellers of each series being set one in rear of the other and out of alinement with each other in order that each propeller may, as far as practicable, operate upon undisturbed air. As each propeller and its supporting means is of the same construction as all the others, a description of one will apply to all. Each propeller shaft 46 is journaled in a box 45 which, as shown in Fig. 2, is secured upon a slotted frame 42, that is supported and adapted to slide on a pair of parallel wires 43, whose outer ends are attached to the ends 5 of the main frame and whose inner ends are connected by turnbuckles 44', so that they may be kept taut. The said wires 43 are supported intermediately of their ends by cross bars 44, through which they pass. The blades 47 and 48 are arranged at right angles to each other and in front and rear, respectively, of the propeller support. The bearing boxes are slotted for the accommodation of grooved pulleys 49 one of which is mounted upon each shaft 46. The cross piece at the inner end of the propeller frame is apertured for the passage of a smooth-surfaced reduced stem of an adjusting screw 51 passing through the adjacent bar 44 and a threaded bearing carried thereby, said screw having an actuating handle 53. A coiled expansion spring 54 is mounted on the screw stem between the frame 42 and a collar on the shaft. On a platform 55 at the center of the frame is a motor 56 upon the opposite ends of the shaft, of which are mounted main driving drums or pulleys 57. From each of these drums a flexible driving band, belt or chain 58 extends over suitable guide pulleys 59, 60, 61 and 62 to the groove pulleys 49 of the shaft of the propellers at each side of the frame, each transmission belt being looped and continuous so as to impart a positive driving motion to the set of propellers connected therewith in the same direction simultaneously. By the described arrangement of the two sets of propellers on opposite sides of the longitudinal center of the machine, the propellers may be made to rotate in reverse directions to drive the machine in a common direction with the effect of securing a gyroscopic action or opposing resistance on opposite sides of the line of flight to prevent deflection of either side of the machine from the path of travel, so that any tendency of either side of the machine to be retarded in motion when the opposite sides of the machine are subjected to variable resistances will be overcome.

It will be understood from the foregoing description that the tendency of the transmission belts to pull the tubular propeller frames inwardly will be counteracted by the springs 54, and that said springs will accordingly at all times force said propeller frames outwardly to take up the slack in the belts and maintain the same taut. By means of the screws the collars may be adjusted to regulate the resistance of the springs and to increase their pressure on the propeller supports and slide them outwardly to take up any undue amount of slack in the belts.

In order to insure the safe descent of the machine in the event of serious injury to the motor, propellers or supporting surface, I provide a parachute attachment adapted to be thrown into operation by the aviator when occasion demands. This attachment comprises a rod or staff formed of a series of telescopic sections 63, 64 and 65, the base section 63 being fixed to the platform 52, springs 66 and 67 arranged between said telescopic sections operating, when released for action, to slide the telescopic sections 64 and 65 upward for the extension of the staff to its maximum limit. The upper end of the rod section 65 is secured to a parachute bag or apron 68 which is adapted to be folded into a box or casing 69 mounted upon the top of the supporting surface 9, through which box or casing and the said supporting surface 9 extends the staff, as shown. To the edges of the bag or apron are attached cords 70 which pass over suitable guide pulleys 71 and through openings in the bottom of the box and are connected with spring actuated winding drums or rollers 72 normally acting to wind up said cord and hold the bag or apron in a collapsed condition. Oppositely swinging doors 73 are provided to close the box or casing 69, and the meeting edges of these doors are notched to provide an opening 74 for the passage of the parachute staff. When the parts are in normal position, the closed doors hold the staff collapsed, the rod sections 64 and 65 being freed for extension upon the release of the doors by the action of the springs 66 and 67, so that the parachute apron will be forced out of the casing and partially elevated thereby, the pressure of the air beneath the partially unfolded apron serving in conjunction with the springs to open the apron to its fullest extent, whereby the descent of the machine will be checked. The doors are provided with keepers 75 to receive a spring actuated locking bolt 76 connected with a looped cord or cable 77 connected with an operating cord 77' passing downward over suitable guide pulleys 78 to a controlling lever 79 arranged so as to be operated by the aviator to release the bolt. The rod section 65 is held from movement by the doors until the bolt is retracted, whereupon the parts will be released and the parachute outspread to allow the machine to descend slowly to the surface of the ground insuring safety in the event of stoppage of the motor and damage to the supporting surface. Each drum 72 is preferably of the construction shown in Fig. 7, being revolubly mounted on a stationary shaft 72ᵃ having a hollow end head 72ᵇ inclosing a coiled spring 72ᶜ fixed at one end to the shaft and at its opposite end to the head.

The uprights or standards 9ᵇ are arranged at opposite sides of the platform 55 and extend upwardly therefrom to the frame of the supporting surface, said standards being suitably spaced apart, as shown. Through these spaces circulation is afforded under normal conditions, but, in order to close said spaces during inclement weather, spring curtains or shields 80 may be provided and mounted upon the standards in such a manner as to be drawn open and secured to close the spaces between the standards, thus protecting the aviator, motor, and parts of the machinery from rain, hail, snow, etc.

Projecting from the rear end of the main frame and reinforced therefrom by braces 81 is a rear rudder frame 82 divided into central and opposite side spaces by partition bars 83. In the central space of this frame is arranged a rear horizontal rudder 84 mounted upon a horizontal shaft 85 journaled in the partition bars. To this shaft is fixed an arm 86 connected by a cord 87 with a lever 88 arranged adjacent the pilot's seat which lever is similar in all respects in construction and operation with the lever 19. By means of the levers 19 and 88 the two horizontal rudders may be adjusted in unison or independently of one another, as desired. In the side spaces of the frame 86 are disposed rudders 89 in the form of blades movable between the horizontal and vertical for steering the machine in a horizontal plane. Each blade is provided at its outer end, adjacent its outer edge, with a trunnion 90 journaled in the frame 82 and at its inner end, adjacent its inner edge, with a trunnion 91 journaled in and extending through a bearing 92 and coupled by a gimbal joint 93 to the rear end of a rod or shaft 94. The forward end of this rod or shaft is journaled in and extends through a bearing 95 and is provided with a head 96. Feathered to slide upon and rotate with the projecting end of said shaft, between the bearing 95 and head 96 is a hand wheel 97 having an actuating crank 98, and about the shaft between the head and hub of the wheel is a coiled expansion spring 99. The bearing and hub of the wheel are provided with toothed clutch faces, whereby the wheel is normally held by the spring fixed to the bearing to prevent rotation of the wheel and shaft. By sliding the wheel forward, the clutch faces will be disengaged and the shaft may be turned to tilt the rudder, the two rudders thus being simultaneously or independently operable to give as sensitive a steering control as may be desired, as well as to give additional safety in providing a rudder in reserve which may be operated in the event of damage to the other rudder. As shown, the rudders may be folded or tilted to a horizontal position when not in use and by tilting either one or both of them downwardly to a greater or less degree they will be adjusted to lie at an angle to the line of flight, to steer the machine in one direction or the other. Preferably one rudder is used for steering to the right and the other for steering to the left, for which they are peculiarly adapted as a result of their peculiar mode of mounting, but both may be adjusted simultaneously when strong side currents of air are encountered to prevent skidding of the machine.

Having thus described the invention, I claim:—

1. A flying machine comprising a frame, a supporting surface, stabilizing wings pivoted for vertical movement at the front of the supporting surface, a sliding rack, gear elements actuated by the rack, automatic means consisting of a pivoted weighted swinging lever which is controlled by the tilting of the machine for sliding the rack, and means actuated by said gear elements for simultaneously adjusting the wings in opposite directions upon the movements of the rack in either direction.

2. A flying machine comprising a frame, a supporting surface, stabilizing wings pivoted for vertical movement at the front edge of the supporting surface, a sliding rack, gear elements actuated by the rack, automatic means controlling the tilting of the machine for sliding the rack, and cam devices actuated by said gear elements for simultaneously adjusting the wings in opposite directions upon the movement of the rack in either direction.

3. A flying machine comprising a frame, a supporting surface, stabilizing wings pivoted for vertical movement at the front edge of the supporting surface, slotted members carried by said wings, a sliding rack, toothed segments actuated by the rack, cam devices actuated by the segments and engaging said slotted members, and a weighted lever carrying a toothed segment meshing with the rack, for imparting sliding motion to the latter upon the tilting of the machine in either direction.

4. A flying machine including a frame, a casing, doors for closing the casing, a telescopic parachute staff, the sections of which are collapsed by said doors, springs for extending the staff sections, a parachute apron carried by the staff and adapted to be folded in the casing, winding drums, cords connecting said drums with the free edges of the apron, a locking bolt for holding the doors closed, and means for releasing said bolt.

5. In a flying machine, a main frame having a supporting surface, a propelling mechanism, a rear frame having central and side spaces, a vertical steering rudder pivotally mounted in the central space, means for operating the same, horizontal steering rudders pivotally mounted in the side spaces to swing downward at an angle to the line of flight, said rudders having inner trunnions forming cranks, rods jointed to said cranks, and means for turning said rods.

In testimony whereof I affix my signature in presence of two witnesses.

ROBERT P. HALL.

Witnesses:
CHAS. D. JONES,
L. W. GODIN.